United States Patent Office 3,116,645
Patented Jan. 7, 1964

3,116,645
PRE-SELECTING GEAR CHANGING MECHANISMS
Alfred Johnson, Halifax, England, assignor to William Asquith Limited, Halifax, Yorkshire, England, a British company
Filed July 8, 1960, Ser. No. 41,690
Claims priority, application Great Britain July 16, 1959
6 Claims. (Cl. 74—334)

This invention relates to preselecting gear mechanisms primarily intended for machine tools and the like, and is particularly applicable to the gear boxes of lathes and horizontal boring and milling machines although it can also be applied to other machines.

The invention is designed to provide a preselecting gear mechanism having means for preventing operation of the gear changing mechanism until the speed of the driven member falls to a predetermined speed.

According to the invention, pre-selecting gear changing mechanism comprises a control member operable to connect motive power to a gear change member, and at the same time cause the speed of the driving member of the gearing to be reduced, a selector device which is adjustable to determine the position to which the gear change member is moved by said motive power, and means responsive to the speed of a driving member and operative to prevent actuation of the gear change member when the speed of the said driving or driven member is greater than a pre-determined speed. Preferably the motive power employed for moving the gear change member is hydraulic, but electrical or mechanical means may be employed if desired. The arrangement is such that whilst the drive is being transmitted through the change speed gearing, a different gear ratio can be selected by the selector device and then when the control member is actuated, the driving speed will be reduced and as soon as this reaches the pre-determined speed, the gear change member will be moved to effect the gear change, whereupon the driving speed will return to normal.

Figure 1:
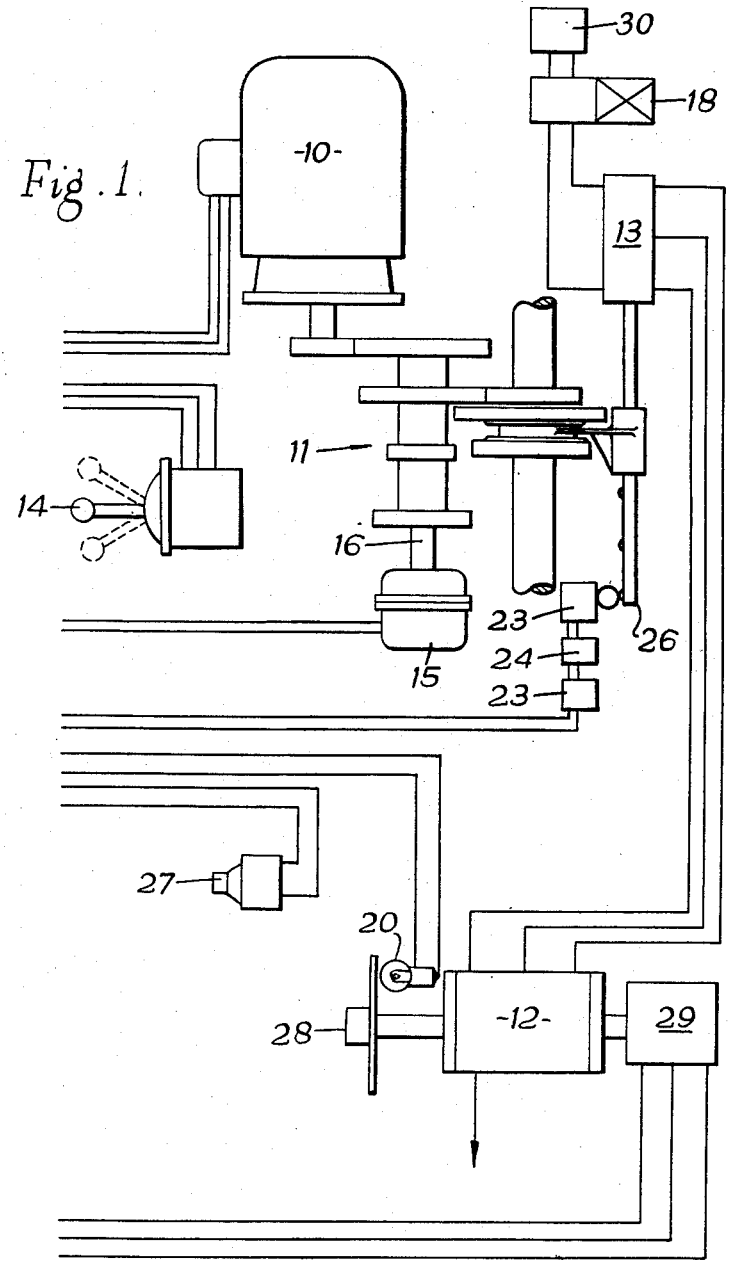
Figure 2:
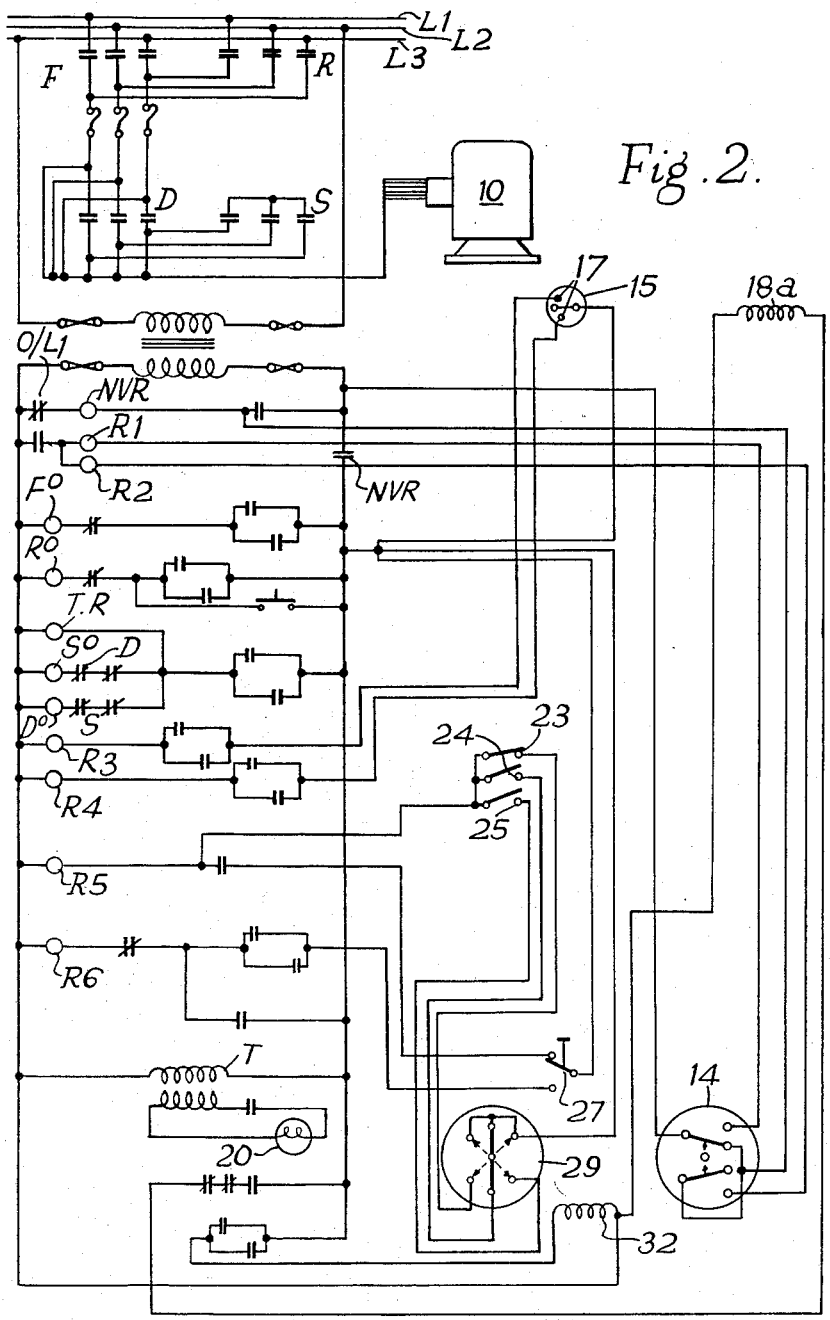

In order that the invention may be clearly understood and readily carried into effect, mechanism constructed according to the invention will now be described, by way of example only, with reference to the accompanying drawings, in which:

FIGURE 1 is a diagram showing the gear mechanism and the main parts of the preselector mechanism, and FIGURE 2 is a diagram showing the electrical parts and connections.

Referring to the drawings, the gear mechanism illustrated is a three-speed gear but it will be understood that any other gear mechanism having more or less than three speeds may be employed. In this arrangement, the power drive to the change speed gear box is by means of a reversible electric motor 10. The gear mechanism 11 and the gear change member for effecting the gear change form no part of the present invention and may be of any convenient construction, and a speed selector valve 12 controls the supply of operating fluid to a cylinder 13 having a piston connected to the movable element of the gear box. The position of the piston within the cylinder 13 will determine which gears of the mechanism 11 are in engagement, and adjustment of the selector valve 12 will determine the position of the piston within the cylinder 13.

A main motor switch 14 is provided for controlling the direction of rotation of the motor 10 and also for stopping the motor. This switch is not connected in any way to the gear change mechanism so that normal stopping, starting and reversing of the motor can be carried out regardless of the setting of the selector valve 12. The motor incorporates an electric brake, but it will be understood that any other type of brake, for example a mechanical brake may be provided. Fluid under pressure is supplied from a source indicated at 30 for the cylinder 13, and may comprise a pump or any other convenient means.

A speed responsive device 15 such as a governor mechanism is operatively connected to a member 16 driven by the gear box, and this speed responsive device is adapted to actuate electrical contacts 17 interposed in a circuit including a solenoid operated valve 18. The solenoid operated valve 18 is interposed in the fluid connections between the fluid supply 30 and the cylinder 13, and the arrangement is such that the solenoid-operated valve is opened only when the speed of the said driven member 16 falls to a pre-determined speed which is the speed at which the gear change should take place.

An indicator device is provided for indicating when a gear change has actually taken place. The indicator device may be in accordance with our co-pending application No. 467/59, but any other convenient indicating device may be used.

It is not necessary to describe the electrical connections in detail as they are clearly shown in FIGURE 2 and are by way of example only. It should be mentioned however, there are three control switches 23, 24 and 25 adapted to be actuated by an actuator 26 which is displaced by the piston in the cylinder 13 and consequently as each switch 23, 24 and 25 corresponds with one gear ratio, the appropriate switch will be closed according to the gear ratio engaged. These work in conjunction with a switch 29 operated by the selector valve so that the gear engaged must correspond with the gear selected before the main driving motor 10 can run again at its normal speed after a gear changing operation, and at the same time cause energisation of the indicator device, which in this example comprises an electric lamp 20. There is also a push button switch 27 connected in the electric circuit so that after a gear ratio has been selected the gear change will be made upon operation of the switch 27.

The various elements in FIGURE 2 are in the standard diagrammatic form, the main items being as follows: $L^1$, $L^2$, $L^3$, are the electric supply lines, and the main driving motor is controlled by contacts F for forward running and R for reverse running and by the star contacts S and delta contacts D, connected to the motor windings in the usual manner, for star-delta starting. $F^0$, $R^0$, $S^0$ and $D^0$ are relays controlling the contacts F, R, S and D respectively. $R^1$ is the main spindle forward run relay, $R^2$ is the main spindle reverse run relay, $R^3$ is the spindle forward plugging relay, $R^4$ is the spindle reverse plugging relay, $R^5$ is the main motor stop relay, $R^6$ is the gear change solenoid relay and N.V.R. is the No. Volts Release, 18a is the solenoid for the solenoid operated valve 18 and T is a transformer for the lamp 20.

The gear change interlock solenoid 32 is energized with the motor contactors, the purpose being that the interlock which is inserted to prevent the gear change button being operated whilst the machine is in a standing position, is thereby withdrawn when the spindle motor is rotating, allowing gear change to be effected in the normal manner.

In operation, and assuming that a gear is in engagement and the motor 10 is running at normal speed, the selector valve 12 is adjusted by means of a knob 28 which is also operatively connected to the rotary switch 29. This is merely the pre-selection of a required speed, and no change in operation takes place until the push button switch 27 is actuated. Whilst the motor is still running at its normal speed, the push button switch 27 is actuated to apply the motor brake and at the same time bring the governor switch 15 into the circuit. When the speed of the member 16 falls to the pre-determined speed for which the governor switch 15 is set, this switch 15 causes energisation of the solenoid valve 18 to supply fluid under pressure to the cylinder 13, and releases the motor brake. The piston in the cylinder 13 is then displaced to the preselected gear position as determined by the selector valve 12, and as soon as the gear change has thus been made, the corresponding control switch 23, 24 or 25 will be closed. The motor 10 will be caused to run again at its normal speed and at the same time the lamp 20 will indicate that the gear change is effected.

It will be seen therefore, that the minimum of manual operation is required for changing the gear ratio, that is the selector knob is first adjusted to the required gear and the selected gear will be automatically engaged upon actuation of the push button switch 27.

In the particular construction described a single gear changing cylinder 13 is employed, but it will be understood that there may be two or more such cylinders each adapted to control one or more gear ratios and to be selectively operated under the control of the selector valve 12. Consequently the invention can be applied to gear boxes having a large number of gear ratios.

It should also be noted that the motor can be running in either the forward or the reverse direction and it is possible to select a gear with the motor running in one direction, operate the gear change button 27, reverse the main motor control switch 14 so that after the gear change has taken place the motor will run in the opposite direction.

In a modified arrangement, in which the electric driving motor is not reversible, mechanically operable means may be provided for reversing the drive to the gearbox. For this purpose mechanical clutches may be provided for connecting the motor to alternative gears connected to or associated with the gear box, for driving the gearbox in either direction.

In any case it will be understood that means will be required to prevent operation of the gear change mechanism except when required, that is when the driving speed is the pre-determined speed at which the gear change should take place.

In the preferred construction illustrated in the drawings, the gear change is effected by hydraulic means, but it will be understood that electrical or mechanical means may be employed, and that the selector device will be modified accordingly to control means for correctly positioning the gear change member.

I claim:

1. A preselecting gear changing mechanism comprising a driving member, a driven member, multiple gear trains providing a plurality of alternative ratios between said driving member and said driven member, a gear change member operatively associated with said multiple gear trains, a motive power source for said gear change member, a selector device adjustable to determine the position to which said gear change member will move when actuated by said motive power source, a control member for connecting said motive power source to said gear change member, and a speed responsive device controlled by said driving member, arranged to prevent actuation of said gear change member when the speed of said driving member is greater than a predetermined speed.

2. A preselecting gear changing mechanism comprising a driving member, a driven member, multiple gear trains providing a plurality of alternative gear ratios between said driving member and said driven member, a gear change member operatively associated with said multiple gear trains, a motive power source for said gear change member, a selector device adjustable to determine the position to which said gear change member will move when actuated by said motive power source, a control member for connecting said motive power source to said gear change member, a governor incorporated with said driving member, means connecting said driving member to said governor, a governor switch incorporated with said governor, said governor switch being preset to operate when the speed of said governor falls below a predetermined speed, said governor switch including controlling means connecting said motive power source to said gear change member whereby actuation of said gear change member is prevented when speed of said driving member is greater than said predetermined speed.

3. A preselecting gear changing mechanism according to claim 2, in which there is a braking device for retarding said driving member, said braking device being adapted for operation by said control member.

4. A preselecting gear changing mechanism comprising a driving member, a driven member, multiple gear trains providing a plurality of alternative gear ratios between said driving member and said driven member, a gear change member operatively associated with said multiple gear trains, a source of hydraulic power for actuating said gear change member, a selector device adjustable to determine the position to which said gear change member will move under the influence of said hydraulic power, a control valve arranged between said hydraulic power source and said gear change member for controlling the flow of hydraulic fluid to said gear change member, a control member for controlling the operation of said valve, and a speed responsive device arranged to prevent opening of said control valve when the speed of said driving member is greater than a predetermined speed.

5. A preselecting gear change mechanism comprising a driving member, a driven member, multiple gear trains providing a plurality of alternative gear ratios between said driving member and said driven member, a gear change member operatively associated with said multiple gear trains, a source of hydraulic power for actuating said gear change member, a selector device adjustable to determine the position to which said gear change member will move under the influence of said hydraulic power, a control valve arranged between said hydraulic power source and said gear change member for controlling the flow of hydraulic fluid to said gear change member, a solenoid controlling the opening and closing of said valve, a governor incorporated with said driving member, means connecting said driving member to said governor, a governor switch incorporated with said governor, said governor switch being preset to operate when the speed of said governor falls below a predetermined speed, said governor switch controlling said solenoid whereby said valve is only opened when the speed of said driving member falls below said predetermined speed.

6. A preselecting gear changing mechanism according to claim 5, in which there is a braking device for retarding said driving member, said braking device being adapted for operation by said control member.

References Cited in the file of this patent

UNITED STATES PATENTS

| | | |
|---|---|---|
| 1,291,779 | Dean | Jan. 21, 1919 |
| 2,943,779 | McNamara et al. | July 5, 1960 |